United States Patent [19]

Sayce et al.

[11] 3,917,479
[45] Nov. 4, 1975

[54] FURNACES

[75] Inventors: Ian George Sayce, Teddington; Francis Henry Howie, Hampton, both of England

[73] Assignee: National Research Development Corporation, London, England

[22] Filed: Dec. 18, 1973

[21] Appl. No.: 425,939

Related U.S. Application Data

[63] Continuation-in-part of Ser. No. 311,153, Dec. 1, 1972, abandoned.

[30] Foreign Application Priority Data

Dec. 3, 1971 United Kingdom............... 56324/71
Apr. 5, 1972 United Kingdom............... 15682/72

[52] U.S. Cl.................................... 75/10 R; 75/65
[51] Int. Cl............................................. C22d 7/00
[58] Field of Search............... 75/10, 65, 88, 77, 68

[56] References Cited
UNITED STATES PATENTS

| | | | |
|---|---|---|---|
| 2,920,951 | 1/1960 | Bretschneider........................ | 75/88 |
| 3,068,089 | 12/1962 | Antonsen............... | 75/63 |
| 3,249,425 | 5/1966 | Aamot................... | 75/68 |
| 3,429,691 | 2/1969 | McLaughlin........... | 75/65 R |
| 3,480,426 | 11/1969 | Neuenschwander.... | 75/10 R |
| 3,684,667 | 8/1972 | Sayce.................... | 75/10 R |
| 3,764,296 | 10/1973 | Gerlach................. | 75/10 R |

*Primary Examiner*—Peter D. Rosenberg
*Attorney, Agent, or Firm*—Cushman, Darby & Cushman

[57] ABSTRACT

The invention concerns a process and furnace by means of which a wide variety of high temperature reactions can be carried out. The furnace is mounted for rotation about a vertical axis and has an exit orifice in its base. Arc or plasma heating means are provided in the roof of the furnace for melting the contents of the furnace so that the molten layer so formed will approximate to a paraboloid of revolution when the furnace is rotated. By controlling the input of material to the furnace, the rate of withdrawal of molten material from an exit orifice in the base of the furnace, and the energy input to the furnace a stable continuous process can be achieved.

7 Claims, 10 Drawing Figures

FIG 10    FUSED PRODUCT

FURNACES

This is a continuation-in-part of our earlier application Ser. No. 311,153 filed Dec. 1, 1972, and now abandoned.

The present invention concerns furnaces for treating materials at high temperatures. Such furnaces have many applications in the field of ceramics and metallurgy. However, the temperature which may be employed is frequently limited by the properties of the container material.

Thus the reaction temperature of a glass-making mixture is limited by the availability of suitable refractory noble metal alloys, and again the temperature at which an ore may be smelted is limited by the rate of reaction of the slag with the refractory lining of the furnace. These reactions have hitherto been carried out at temperatures of over 2,000°C only in expensive and specialised equipment quite unsuitable for economic large scale processing.

According to one aspect of the present invention there is provided a furnace for treating materials at high temperatures, the furnace comprising an outer shell mounted so that it can be rotated about a vertical axis, a refractory lining within the outer shell, means for rotating the shell about the vertical axis, inlet means at the upper end of the shell for introducing a material to be treated by the furnace, means for heating a material to be treated when supported within said shell, and an exit orifice in the base of the shell for withdrawing molten material from the furnace.

According to another aspect of the present invention there is provided a process for melting materials comprising introducing the material into a furnace, heating the material by a plasma or arc so that the material melts, and rotating the furnace about a vertical axis so that the molten material forms a liquid wall the internal surface of which is a paraboloid of revolution.

Preferably the process is continuous, material being introduced into the furnace as molten material is withdrawn. This is achieved by adjustment of the material feed rate, the heat source, the cooling rate, the gas flow rate and the rate of rotation of the furnace. By altering these parameters, the retention time, internal temperature, and product withdrawal rate may be controlled.

An embodiment of the present invention will now be described by way of example and with reference to the accompanying drawings in which.

Figure 1:
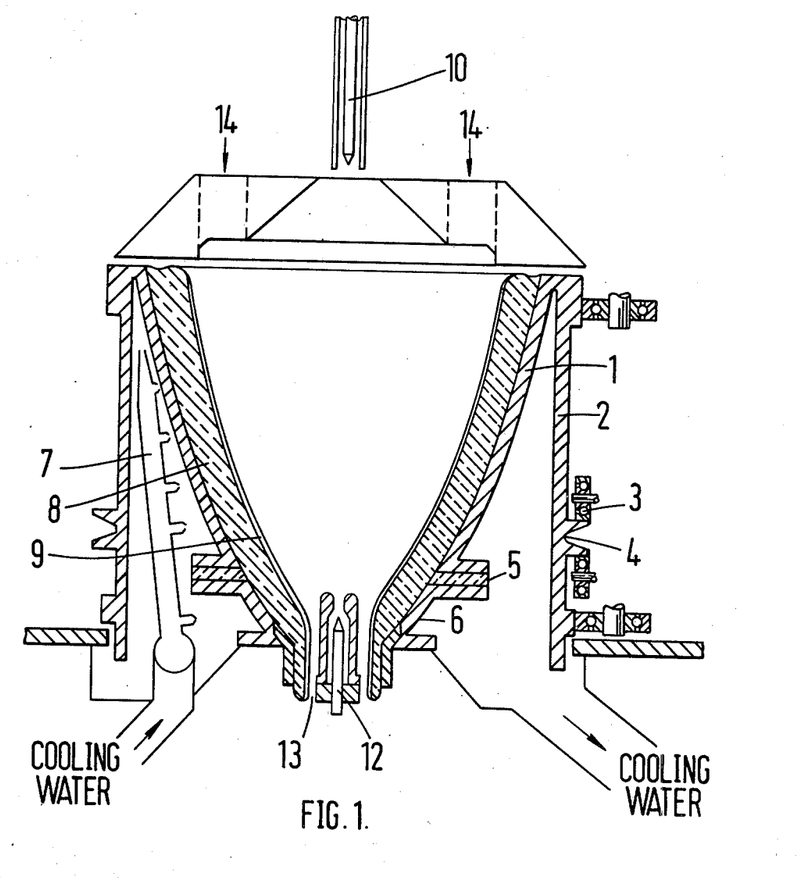
FIG. 1 is an axial section through a furnace constructed in accordance with the present invention.

The furnace shown in FIG. 1 is heated by an arc transferred from a non-consumable tungsten cathode in the roof of the furnace to an anodic plasma torch anode placed in the exit orifice of the furnace. The furnace body consists of a metal shell 1, which may be paraboloidal or cylindrical other suitable shape, supported within a steel cylinder 2 mounted on roller bearings 3 which permit rotation about a vertical axis. The steel cylinder 2 is driven by means of a belt drive to pulley 4 from a variable speed motor (not shown). The lower section of the inner metal shell is attached, via an insulating section 5, to an orifice section 6. The whole internal assembly is cooled by water sprays 7. The lining of the furnace may take a variety of forms depending on the process being undertaken, but for a typical ceramic fusion process will consist of a solid ceramic layer 8 next to the cooled furnace wall, and the innermost layer consists of liquid ceramic 9, stably supported in a parabolic configuration and heated by the plasma within the furnace. The furnace roof may be made from steel lined with refractory to prevent excessive heat loss. In the device depicted in FIG. 1 the heat is provided by a transferred arc from a cathode 10 set in the furnace roof and a plasma torch 12 mounted in the exit orifice 13 of the furnace. To start an arc the cathode 10 is advanced until it contacts the torch 12. The cathode 10 is then withdrawn to the operating position giving an arc from end to end of the furnace. The heat of the arc between the plasma torch and the cathode within the furnace is employed efficiently to melt the innermost layer of the furnace lining forming a stable paraboloidal film held in place by centrifugal force. By reducing the rate of rotation of the furnace the liquid may be caused to descend within the furnace and fall from the exit orifice 13. However the preferred method of operating the furnace involves continuous feeding by addition of fresh material, e.g. through inlet ports 14 surrounding the cathode 10. In this way the liquid layer is continuously replenished, it builds up inwards so that the centrifugal stabilising force is diminished, and the innermost liquid layer then flows slowly downward leaving by the exit orifice 13. It will be readily perceived that the system is self-stabilising and that the rate of withdrawal of liquid depends on the rate of feed of fresh material. The centrifugal force caused by the rotation of the furnace causes the material leaving the exit orifice to miss the torch 12. The cathode 10 may be moved between the starting and operative positions by a hydraulic ram arrangement shown in FIG. 2 at 11. The cathode 10 is covered by a metal sheath 10' and carried electrical contacts 10''.

In some cases it is necessary to fit an annular ring of coated metal, or of refractory material (not shown) to prevent loss of liquid products at the upper edge of the paraboloidal film, and to ensure that all liquid products leave by the bottom orifice 13. In other cases it may even be desired to withdraw liquid products at the upper periphery of the crucible.

Figure 2:
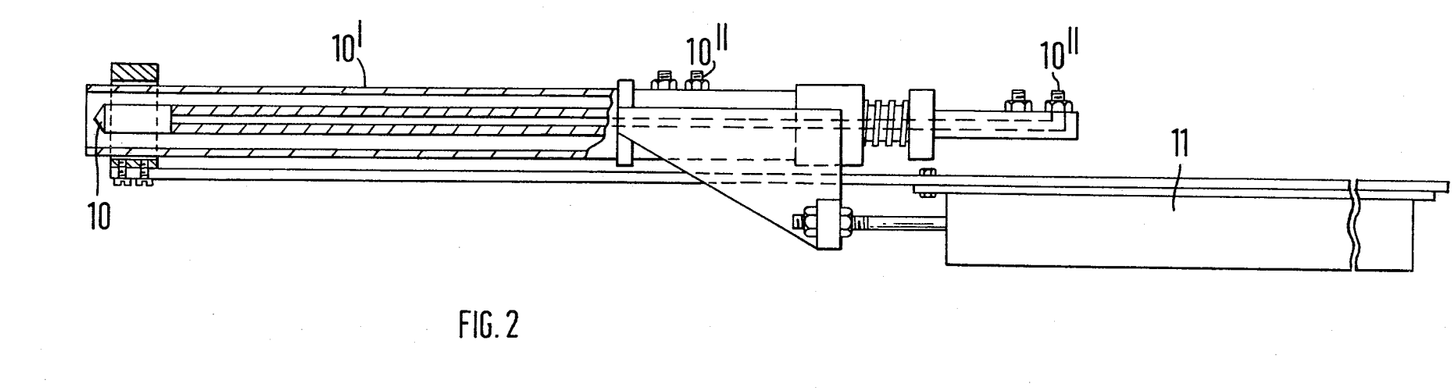
FIG. 2 is a schematic view of a movable electrode suitable for use with the furnace of FIG. 1.
Figure 3:
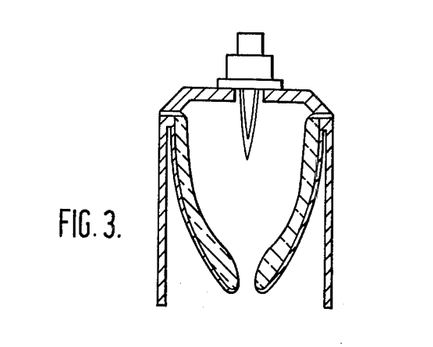
FIGS. 3, 4A, 4B, 5 and 6, are schematic views of alternative heating arrangements.
Figure 5:
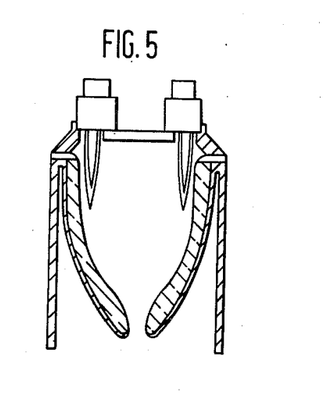

The heat source depicted in FIGS. 1 and 2 represents only one of several which may be used in this furnace. The simple DC plasma jet may be used alone in the non-transfer red mode (FIG. 3), when more efficient heating is achieved by mounting the torch eccentrically on the furnace roof; alternatively an AC arc heater (not shown) may be employed. The arc may be transferred between a plasma torch and a solid electrode (FIG. 2) in which case both AC and DC transferred currents may be used or the transfer may be caused to occur between two or more plasma jets (FIG. 5). In one such configuration three plasma jets, conveniently mounted in the furnace roof, are operated on DC to provide pilot plasmas. Three phase AC power is then fed to the torches giving very efficient heating of the furnace contents.

Figure 4A:
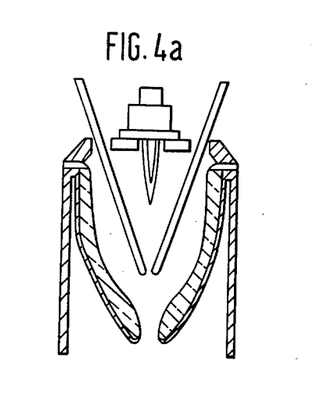
Figure 4B:
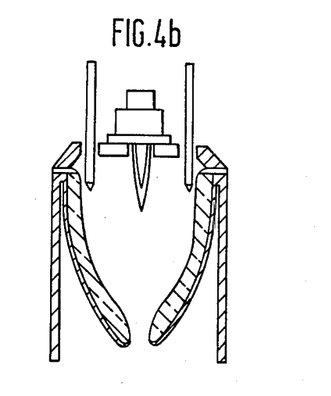

In a further configuration (FIG. 4 but with three carbon electrodes) which proves both efficient and economical, three consumable and adjustable carbon electrodes are mounted in the furnace roof. A three phase arc is struck between the electrodes while they are held together at the centre of the furnace. After initiation of the arc the electrodes are swung out and back so that the arc fills the furnace (FIG. 4B). A DC plasma jet may be used to aid extablishment of a stable arc. As the inner layer of the furnace lining melts it becomes conducting, if it was not so in the cold, and the arc is then transferred to the thin liquid layer on the furnace wall, which is further heated by resistance heating due to the passage of the electrical current. Under these conditions very efficient heating of the furnace contents is achieved and with continuous feeding of the electrodes, continuous operation is readily obtained. It is not necessary to provide a gas feed when the furnace is used in this way, however if control of furnace atmosphere is required gas may be supplied to the furnace. If it is required to operate the furnace with an oxidising gas, e.g. to prevent vaporisation of components in glass making, this may still be achieved using the carbon arc heat source, but in this case an inert gas (e.g. $ArN_2$ etc.) is fed down sheaths surrounding the carbon electrodes, while an oxidising gas (e.g. $O_2$ air etc.) is fed to the furnace itself. A similar configuration can be used employing non-consumable (e.g. water-cooled metal) electrodes if desired.

Figure 6:
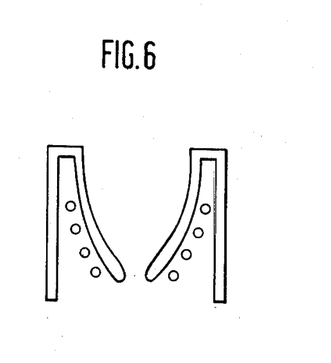

A multiplicity of additional configurations of plasma jet(s) with consumable or non-consumable electrodes will be apparent to those skilled in the art. The use of DC, AC single or multiphase electrical power may be employed using these arrangements. A further possible heat source is induction heating, either by inductively heating the molten contents of the furnace itself or by inductively heating gas before passage into the furnace. In the former arrangement the outer wall of the furnace must clearly be made of insulating material (e.g. silica) while the inner layers, heated initially by subsidiary means, may be heated inductively by means of stationary coils mounted around the paraboloidal furnace wall (FIG. 6). A further type of heating arrangement which may be employed is the use of electrically augmented flames. These are known in the art and are fully described by the article by Marynowski C, Karloirt B, and Hirt T.J, in Ind. Eng. Chem. Proc. Dec. 6, 1967, 375.

Figure 10:
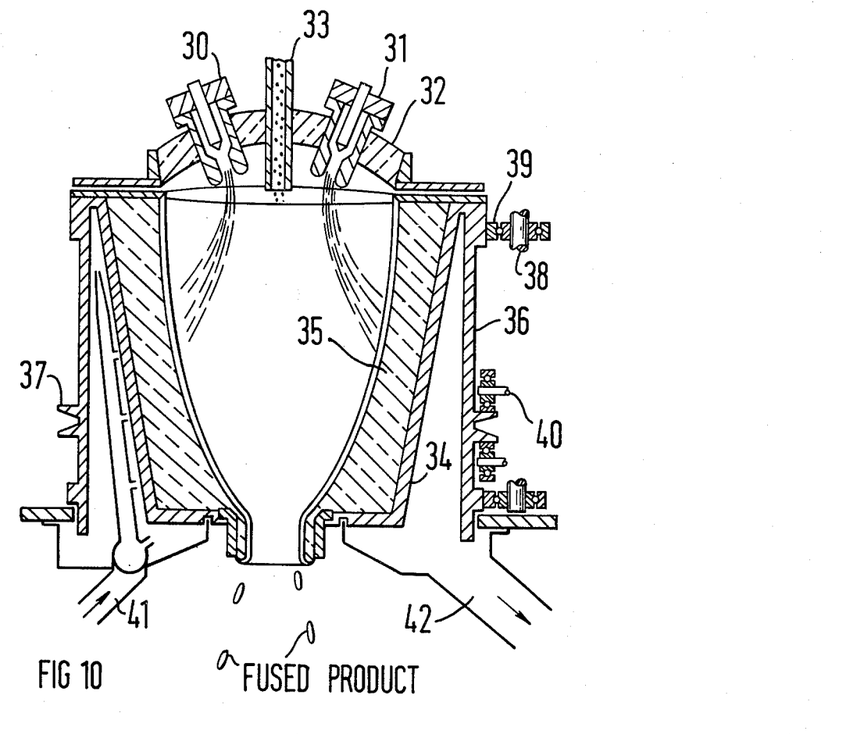

However, a preferred embodiment is shown in FIG. 10. In this embodiment a pair of plasma torches 30, 31 are mounted on a ceramic furnace roof 32 on either side of a feed probe 33 by means of which particulate material to be heated can be introduced into the furnace for treatment. The furnace itself comprises a metal barrel 34 in which is mounted a ceramic liner 35. The barrel 34 has an outer shell 36 provided with a pulley 37 by means of which the furnace can be rotated about its vertical axis. Also provided is a suppport pillar 38 carrying bearings 39. Further bearings 40 are positioned to run on the flanges forming the pulley 37. Water for cooling the furnace is taken to the furnace by a pipe 41 and is removed via a conduit 42.

The furnace may be employed using one of the above heat sources to fuse or react a variety of materials. In its simplest form the furnace may be lined with a ceramic material, the inner surface may be melted as described above, the furnace may be fed with fresh solid ceramic and this will melt and leave the furnace as a molten stream which may be cast, made into fibres, or otherwise employed.

When the furnace is fed with two or more materials these may be caused to react to produce a compound product. Thus if the furnace is fed with an appropriate mixture of oxides, these may be caused to melt and react on the liquid wall, and after reaction and homogenisation on the liquid wall the liquid product, which may be a glass, flows from the furnace to be cast, made into fibres or otherwise employed. The extremely high temperatures which are achieved within the furnace enable rapid reaction and thus high throughputs, of great importance to the glass manufacturer. Reaction occurs in a thin, hot and therefore non-viscous layer under centrifugal force within the furnace. Under these circumstances the evolution of gases, normally a serious problem in glass making reactions, can occur rapidly and with speedy bursting of the bubbles formed due to the centrifuging of the bubbles inwards toward the hot central zone.

While the use of solid feed stocks is clearly the most important application of the furnace, the use of liquid reagents and even reactive gases is advantageous under certain circumstances.

Thus it may be desired to treat a molten product from another process, e.g. a metallurgical slag, or it may be desired to condense vapour products on the liquid wall either by simple condensation or by condensation following chemical reaction, as for example in the preparation of silica by reaction of silicon tetrachloride with oxygen.

As regards the composition of the wall material, it is envisaged that the furnace will most commonly be used with a water-cooled metal outer paraboloidal conical (or cylindrical) wall. This may be used to contain a liquid product, but generally the layers in closest proximity to the cooled metal will be solid as in the so-called scull-cooled method of melting reactive materials in conventional technology. In many cases the layer in contact with the metal wall is of the same or similar composition to that of the liquid inner layer, but under certain circumstances it may be desirable, e.g. because of the high thermal conductivity of such a material, to interpose a solid refractory layer between the liquid lining and the metal wall. Under suitable conditions of operation this refractory wall exhibits a prolonged life under furnace conditions, because the flow of hot liquid in the innermost layer of the furnace occurs predominantly in the surface layers and little erosion of the refractory lining takes place.

Just as the feeding of material into the furnace may be continuous or intermittent, so may the withdrawal of liquid products be continuous or intermittent. In one mode of use, and by suitably designing the contours of the furnace wall, the furnace may be "filled" with liquid product, and may then be slowed down or stopped when the liquid contents may be withdrawn in a "batchwise" process. In another mode of use the furnace is continuously fed and the liquid product is continuously withdrawn.

Figure 7:
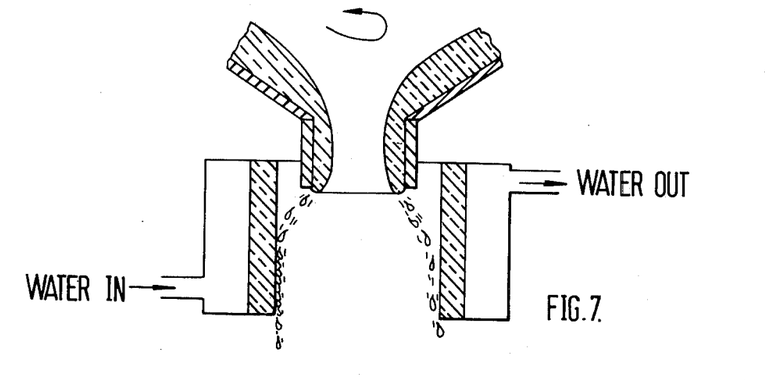
FIGS. 7, 8 and 9 are axial sections showing alternative methods of collecting molten material from the base of the furnace constructed in accordance with the present invention.
Figure 8:
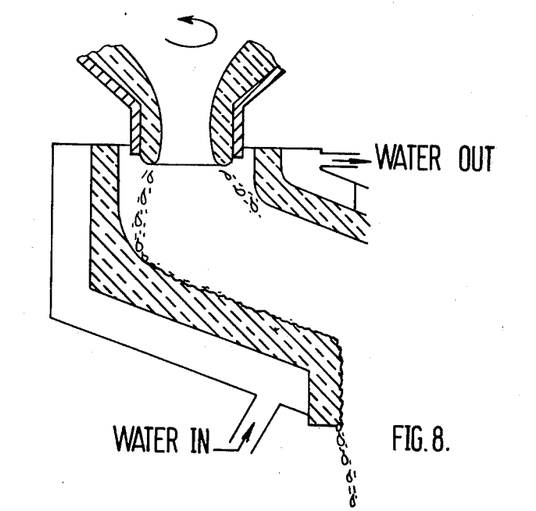
Figure 9:
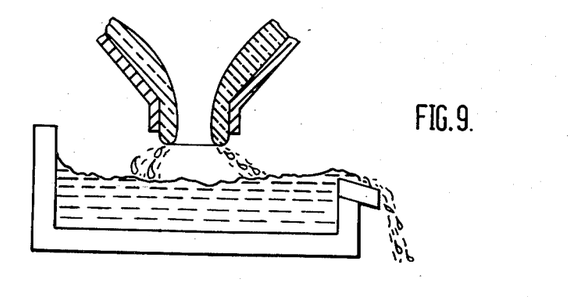

When the liquid product emerges from the exit orifice it emerges as a curtain or stream of droplets flung out at an angle by the rotation of the orifice itself. Where this is undesirable and a more controlled stream is required the flow may be caught by a cylindrical collector which may be water cooled, and which may be lined like the furnace itself by a "scull" of solid product, down the inner walls of which the liquid product flows. FIGS. 7 and 8 show a variety of arrangements of such collectors. Other arrangements are also possible, for example a stationary holding tank as shown in FIG. 9 may also be used. The liquid stream, collected if necessary by suitable collection means, may then be employed in any subsequent process. Such processes include quenching to yield metastable products, granulation, moulding, fiberization or other processes.

As discussed below the second and important class of products from the furnace comprises gaseous or vaporous products. These may be withdrawn from a chimney set in the roof of the furnace or from the exit orifice with the liquid product. In certain circumstances, e.g. when executing a metallurgical fuming operation, it may be necessary to treat the vaporous product with reactant gas (e.g. air or oxygen) to produce a solid fine powder oxide fume which is then cooled and collected by well known means.

It is envisaged that the furnace will find application in a variety of processes, and examples will be given of several of the more important. These include simple melting of a single refractory component, melting of a mixture of refractory components so as to effect a reaction and form a compound material which may be a glass or ceramic product, metallurgical fuming whereby a volatile component or components may be separated from a liquid slag or ore, and finally metallurgical smelting whereby an oxide, an oxide mixture, or other metallic compounds are reduced to liquid metal on passage through the furnace. These examples demonstrate the use of several different heat savers.

MELTING OF SINGLE REFRACTORY COMPONENT e.g. ALUMINA

The furnace may be used with any of the heat sources described above. The furnace lining outer layer consists of solid alumina in contact with the cooled metal wall. The lining may be rammed in place or cast by pouring a castable mix into the spinning furnace and allowing this to set while continuing to rotate the furnace. The alumina is heated by means of a plasma or arc device until the innermost layer is molten. The liquid layer may then be supplied with powdered alumina which fuses at the top of the furnace and flows down under gravity to leave the furnace as a stream of molten droplets from the exit orifice. By suitable adjustment of feed rate, input power and furnace rotation speed it is possible to control the temperature of the emerging product, or if required to effect a batchwise process whereby batches of molten alumina are delivered from the furnace exit rather than a continuous flow. The melting of alumina is exemplified using three different heating arrangements.

TRANSFERRED ARC

A plasma jet is moulded in the lid and operated in the non-transferred mode using argon (3 l/min) at a current of 265 A and voltage of 33 V. The electrical circuit is as shown in FIG. 2. After 1 minute the arc is transferred to the graphite electrode 12 projecting upward through the bottom of the crucible, by adjusting a resistance in the circuit between the torch anode, and the switch 11. Once transfer is achieved, switch 11 is opened and all the electrical power is thus transferred to the graphite electrode, which is then withdrawn to the exit zone of the furnace by means of a hydraulic ram or lead screw. The electrical parameters are then 170 V and 120 A (35.7 kW). After a further one minute's operation these parameters stabilize at 110 V, 250 A (27.5 kW).

The latter figures correspond to operation with a heated furnace and under these conditions the plasma is quiet and the current is transferred in part via the hot liquid ceramic.

Under these conditions it is possible continuously to feed the furnace and a stream of molten alumina (41.7 g/min) may be continuously produced using power of 27.5 kW, corresponding to a power consumption of 11.0 kWh/kg. This figure is of course not an optimised figure and considerable improvements in heating efficiency may be achieved.

Again alumina may be continuously melted using a carbon arc heat source. Thus a two electrode DC carbon arc unit may be set up and inserted through the roof of the furnace. With the two electrode tips in close proximity (FIG. 4A without plasma torch) the arc is struck and operated within the furnace as a free-burning arc at 116 A, 141 V (16.4 kW). On adjusting the electrodes so that the tips approach the furnace wall (FIG. 4B without plasma torch) the arc is transferred to the molten ceramic and proceeds to operate very stably and quietly at 120 A, 130 V (15.6 kW). Under these conditions the alumina lining of the furnace melts and liquid alumina flows from the exit orifice. The circuit between the two electrodes is completed via two arcs and conduction through the molten refractory. This proves to be a highly efficient means of heating the furnace contents and may be employed with single or multi-phase AC.

TWO PLASMA TORCHES

In a third experimental arrangement alumina may be continuously melted using a transferred arc between two torches as shown schematically in FIG. 5.

Two specially designed plasma torches are set in the furnace roof which is made from a rammed alumina composition. The two torches are operated first in the non-transferred mode, as conventional plasma torches but after initial heating in this way, the electrical circuit is arranged such that only one torch acts as a conventional torch producing a small pilot plasma, and the second torch is operated at a potential cathodic to the first torch. In this way electrons flow from the cathode of the second torch to the anode of the first (pilot) torch, and a large plasma fireball is produced within the furnace. As the furnace contents become heated an increasing proportion of the current passing between the two torches flows through the melt, rather than via the gas phase increasing the efficiency of heat transfer considerably.

Typical electrical parameters of the system in stable operation are as follows: pilot plasma torch, operating on argon (40 l/min) 25 V and 132 A i.e. 3.3 kW. Transferred arc operating on nitrogen (50 l/min) 130 V, 320 A i.e. 42.3 kW. Feed of alumina powder continuously melted 0.9 kg/h. Power consumption for alumina fusion 51 kWh/kg.

It should be noted that the above figures are preliminary figures for a small and non-optimised furnace. Larger furnaces, and improvements in design, result in considerable increases in efficiency.

MELTING OF A MIXTURE OF REFRACTORY COMPONENTS

A castable mix of silica, alumina and baria is made up as follows: silica (30 mesh 1500 g.), alumina (100 mesh 1200 g.) and baria (fine powder 300 g.) is mixed with water and the castable slurry is poured into the spinning furnace. After spinning overnight, the furnace is stopped and the ceramic which is now solid is allowed to dry in air. It is then gently fired by plasma heating in situ to about 800°. After firing the lining is heated plasma means until the inner layer is molten. The inner layer is then fed continuously with a powdered mixture of the same composition which reacts on the inner surface and flow downward as a liquid glass. The glass leaves the furnace by the exit orifice and may be rapidly quenched to yield a transparent fully reacted glass product. By suitable heat treatment crystallization may be induced and a glass ceramic product is then obtained. Typical operating parameters for the above experiment using the two torch plasma heater described above are: Pilot plasma torch, operating on argon (40 l/min) 25 V 180 A, i.e. 4.5 kW. Transferred arc operating on nitrogen (50 l/min) 150 V 300 A, i.e. 45 kW. Feed of liquid ceramic product 3.3 kg/h, i.e. power consumption for glass preparation 27 kWh/kg. These figures are again only preliminary data from a small-scale furnace.

It is of considerable interest to note the ability to produce a fully reacted glass product at high rate of throughput, especially as the composition chosen above, would be very difficult to react by conventional techniques. After continuous operation for some time the droplets of clear glass which are collected by quenching with water are substantially free from bubbles, which are normally a great cause of difficulty in conventional glass-making practice. The reason for the lack of bubbles is that reaction and fusion of the glass making components occurs high on the paraboloidal wall of the furnace, in a region of very high temperature and high acceleration due to the rotation of the furnace. Under these conditions the glass has low viscosity and the gas bubbles are readily removed by a process of centrifugation.

It is not necessary to collect the glass in the form of droplets, and the stream may also be continuously cast (and if required quenched), or alternatively the speed of the furnace may be periodically reduced when a large quantity of molten glass is produced. Under conditions of batchwise operation substantial billets of glass or ceramic may be collected e.g. in graphite moulds for subsequent heat treatment or other use.

METALLURGICAL FUMING

The furnace lining consists of a ground tin-containing slag mixture formed as a castable mix using an organo-silicate binder. After drying and gentle firing using plasma heating, the slag liner is strongly heated so that the inner layer becomes molten. It is then fed continuously with ground tin-containing slag, while being heated in a neutral atmosphere. Volatile tin species are evolved from the metal; these emerge with the gas stream which is cooled by air-jets after leaving the furnace. The tin species are converted to a fine-particle fume of tin oxide which is collected by cyclones, bag filter units, electro-static precipitators or other well known means.

The effectiveness of this method is demonstrated in the following example. A low level tin slag, containing 2.41% tin is made, as above in the form of a furnace lining. The furnace is then heated usaing a DC arc transferred from a plasma jet in the roof of the furnace to a carbon electrode inserted through the exit orifice (FIG. 1), until equilibrium is reached and no fume or slag are emerging. The furnace is then continuously fed with powdered slag (2.41% tin) and the fume is collected, either by withdrawing through a chimney set in the roof of the furnace, or by withdrawing together with molten treated slag at the exit orifice, or by other means. Withdrawal by a chimney in the furnace roof is the preferred method of operation. The furnace is fed with powdered slag at a rate of 52 g/min while being heated at a power of 31.5 kW, corresponding to a power consumption of 10.1 kWh/kg of slag. The ho exhaust gases are treated with air, cooled, and collected in a cyclone and bag filter unit, where a product consisting substantially of pure tin dioxide fume is collected.

The treated slag leaving the exit orifice is quenched with water, dried and analysed. A typical analysis of material treated under the conditions is 0.41% tin, indicating that 83% of the tin content of a slag containing originally 2.41% tin may be removed in this way. Mass balance indicates that approximately 100% of the fume evolved may be collected by using efficient cyclones and bag filters. The corresponding power consumption for removal of tin with this small-scale furnace is 505 kWh/kg of tin metal recovered.

Lead and zinc-containing slags may be treated in the same way under reducing conditions to yield a fume product containing the oxides of these metals, and in some cases it is advantageous to carry out the fuming reaction in the presence of sulphides, chlorides, or other compound in order to enhance the rate of volatilisation.

TOTAL VAPORIZATION OF A CERAMIC/CARBOTHERMIC REDUCTION

A liquid ceramic may be totally vaporized using the new furnace. Thus a liner is cast from alumina as described above. This is strongly heated under neutral or reducing conditions and the liquid surface is continuously fed with finely powdered alumina and carbon powder in an appropriate stoichoimetric ratio. The oxide fuses on the furnace lining where it reacts with carbon and vaporizes totally as a mixture of $Al$, $Al_2O$ and $CO$ vapour species. The vapour may be quenched under inert conditions to yield a product containing free aluminum metal, or it may be re-oxidised to yield a fine particle alumina powder, or it may be otherwise reacted to yield other fine particle refractory powders. Carbides, nitrides and borides may thus be prepared. This example demonstrates both total vaporization of feed stock and also carbothermic reduction of metal oxides.

METALLURGICAL SMELTING

The furnace is lined with a suitable refractory lining, e.g. alumina, magnesite, etc. It is strongly heated under reducing conditions, the furnace being supplied with natural gas as a reducing agent. The heated furnace is then supplied with a continuous stream of iron oxide which is rapidly reduced to metallic iron which forms a molten layer flowing down the alumina wall and leaving the furnace as a liquid stream. If desired slag forming agents may be added when the slag being less dense than metallic iron forms the innermost liquid layer, resting on liquid iron which in turn rests on the refractory wall. The two liquid layers flow downward through the furnace and the two components are separated by suitable settling means. The iron may be treated by well known techniques to yield steel after leaving the furnace, or if desired suitable conditions may be established within the furnace to yield a steel produce.

The furnace may be used in the same way to yield ferro-alloys by reduction of mixtures of metal oxides or if desired other metals and alloys may be made in this way.

Although the furnace has been described as being vertical, and the liquid wall forming a paraboloid of revolution, it is of course conceivable that useful results could be obtained if the axis of rotation is at a slight angle to the vertical. In such a case the liquid wall would not be an ideal paraboloid of revolution.

We claim:

1. A process for treating molten materials comprising the operations of introducing material through an orifice defined at the upper end of a vertical furnace;

heating the material by an electric arc between at least two electrodes one of which is mounted in the furnace roof;

rotating the furnace about a vertical axis at such a speed that the molten material forms a liquid wall the internal surface of which approximates to a paraboloid of revolution;

withdrawing molten material from an exit orifice defined in the base of said furnace; and adding further raw material to the molten material present in the furnace while maintaining said electrical arc.

2. A process as claimed in claim 1 wherein the electrodes comprise two or more plasma jets, a transferred arc being maintained between said plasma jets.

3. A process for treating molten materials comprising, the operations of introducing raw materials into a vertical furnace through an orifice defined in the roof of said furnace;

initially heating the material by at least two plasma torches operating independently in the non-transferred mode;

subsequent to said initial heating causing the first of said plasma torches to act as a conventional plasma torch producing a pilot plasma;

causing a second of said plasma torches to operate at a potential different to said pilot plasma produced by said first pilot torch so as to transfer an arc to said pilot plasma;

rotating said furnace about its vertical axis at such a speed that the molten material forms a liquid wall within said furnace the internal surface of said wall approximating to a paraboloid of revolution; and withdrawing molten material from orifice defined in base of said furnace and adding further raw material to the molten material remaining in said furnace while maintaining said transferred arc within said furnace.

4. A process for treating molten materials comprising the operations of introducing the raw material into a vertical furnace through an orifice defined in the roof of said furnace;

heating the material to a molten state by transferred arc between upper and lower electrodes, the upper electrode being mounted in the roof of said furnace and the lower electrode being mounted beneath the exit orifice of said furnace in such a manner that the transferred arc between the two electrodes passes through the exit orifice;

rotating the furnace about its vertical axis at such a speed that the molten material forms a liquid wall within said furnace, the internal surface of said wall approximating to a paraboloid of revolution so that the molten material does not impinge on said lower electrode;

withdrawing molten material from an orifice defined in the base of said furnace adjacent said lower electrode; and adding further raw material to the molten material in said furnace while maintaining said transferred arc within the said furnace.

5. A method as claimed in claim 4 wherein said lower electrode is a plasma torch and wherein means are to be provided for advancing said upper electrode into said furnace until it is possible to establish an arc between said upper electrode and said plasma torch.

6. A process for treating molten materials comprising the operations of introducing material via an orifice defined at the upper end of a vertical furnace;

heating the material by a transferred electric arc between two electrodes mounted in the upper end of the furnace;

rotating the furnace about a vertical axis at such a speed that the molten material forms a liquid wall the internal surface of which approximates to a paraboloid of revolution;

withdrawing molten material from an exit orifice defined in the base of said furnace; and adding further raw material to the molten material present in the furnace while maintaining said electrical arc.

7. A method as claimed in claim 6 wherein the electrodes comprise a pair of plasma torches.

* * * * *